United States Patent [19]

Stiff et al.

[11] Patent Number: 4,530,293
[45] Date of Patent: Jul. 23, 1985

[54] BILLET PLANTER

[75] Inventors: Rodney A. Stiff; Malcolm J. Baker, both of Bundaberg, Australia

[73] Assignee: Versatile Corporation, Vancouver, Canada

[21] Appl. No.: 387,466

[22] Filed: Jun. 11, 1982

[30] Foreign Application Priority Data

Jan. 26, 1982 [CA] Canada ................................ 394941

[51] Int. Cl.³ .............................................. A01C 11/02
[52] U.S. Cl. ............................................ 111/2; 198/733
[58] Field of Search ................. 111/1, 2, 3; 414/502, 414/528, 23; 198/396, 397, 443, 453, 733

[56] References Cited

U.S. PATENT DOCUMENTS

| 1,182,458 | 5/1916 | Coleman | 198/733 |
| 3,367,534 | 2/1968 | Carter | 198/397 X |
| 3,907,135 | 9/1975 | Populin et al. | 414/528 |
| 3,963,138 | 6/1976 | Fowler | 414/528 X |
| 4,005,805 | 2/1977 | Faxas | 111/2 X |
| 4,047,631 | 9/1977 | Diz | 414/528 X |
| 4,204,491 | 5/1980 | Quick | 111/3 |

Primary Examiner—Robert A. Hafer
Assistant Examiner—D. D. DeMille
Attorney, Agent, or Firm—Parkhurst & Oliff

[57] ABSTRACT

A sugar cane billet planter has a main bin and a sorter bin adjacent the main bin. Billets are moved by a main bin elevator from the main bin to the sorter bin and, thence, by a sorter bin elevator from the sorter bin to a billet chute. The elevator used to convey billets from the sorter bin to the billet chute uses a chain with conveyor fingers, each finger carrying an individual billet in an end-to-end relationship with adjacent billets. Sorter fingers project perpendicularly from the chain, align the billets within the sorter bin and allow them to be carried by the conveyor fingers. The chains and conveyor fingers are operable within a recess of a width slightly greater than the width of the chain and conveyor fingers.

8 Claims, 10 Drawing Figures

BILLET PLANTER

INTRODUCTION

This application relates to an improved sugar cane billet planter.

BACKGROUND OF THE INVENTION

Sugar cane billet planters are relatively new mechanical developments and have become popular in planting sugar cane billets. One planter enjoying customer acceptance is the planter disclosed in Australian Patent Specification No. 52,354 entitled SUGAR CANE PLANTING. A modification of this particular planter has been developed and is disclosed in Australian Patent Application No. 487,810.

The planters disclosed in the above-identified patent specification and application are commonly called Populin planters. They are subject to improvement. One such improvement relates to the elevator used on the Populin planters. The Populin elevator carries cane billets in lateral flights which extend between a pair of chains. Each flight may grasp more than one billet and, to ensure even planting, an elaborate mechanism has been incorporated to return any excess billets in each flight to the supplying hopper. This mechanism is unnecessary with an improved design.

A further improvement relates to the elevators. Each elevator in the Populin planter requires two chains for each flight. This unnecessarily increases maintenance and initial machinery costs.

SUMMARY OF THE INVENTION

According to the invention, there is disclosed a billet planter comprising a main supply bin, a sorter hopper adjacent said main supply bin, a first billet chute, a supply bin elevator in said main supply bin and a first sorter bin elevator in said sorter hopper, a recess extending substantially the distance of said sorter bin elevator from said sorter hopper, said sorter bin elevator comprising chain means and conveyor fingers located alternatively on opposed sides of said chain means, said chain means and said conveyor fingers being operable within said recess to convey billets longitudinally in an end-to-end relationship substantially parallel to the direction of movement of said chain means.

BRIEF DESCRIPTION OF THE SEVERAL VIEWS OF THE DRAWINGS

The invention will now be described, by way of example only, with reference to the accompanying drawings in which.

DESCRIPTION OF SPECIFIC EMBODIMENT

Figure 1:
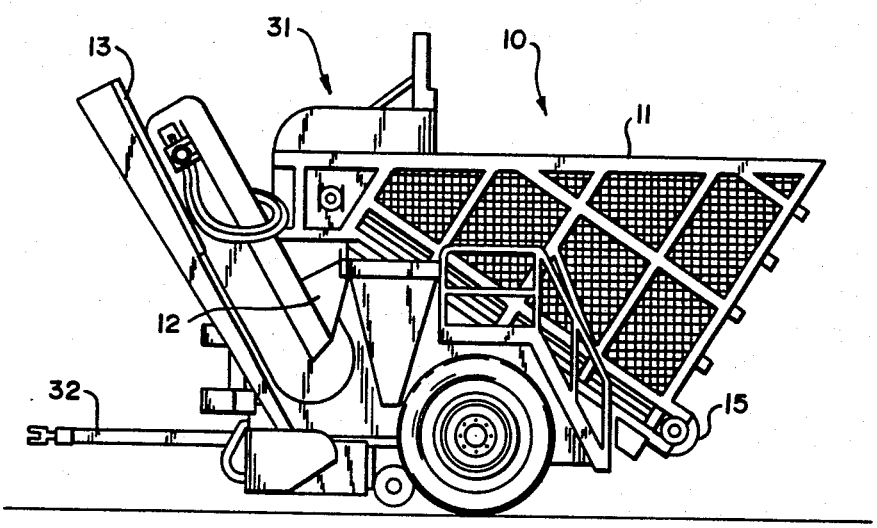
FIG. 1 is a side view of the billet planter.
Figure 2:
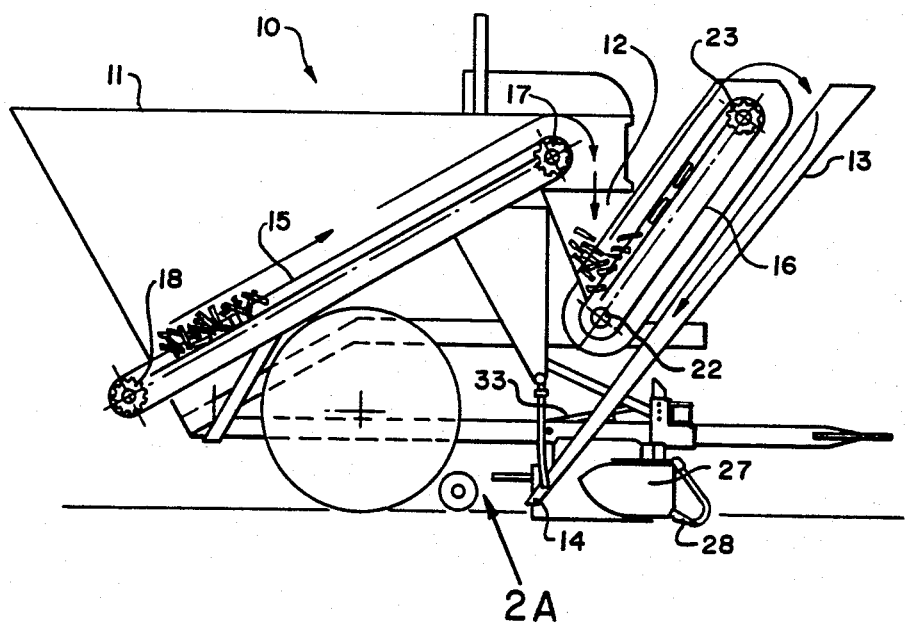
FIG. 2 is a diagramatic side view showing the flow of billets through the planter.
Figure 3:
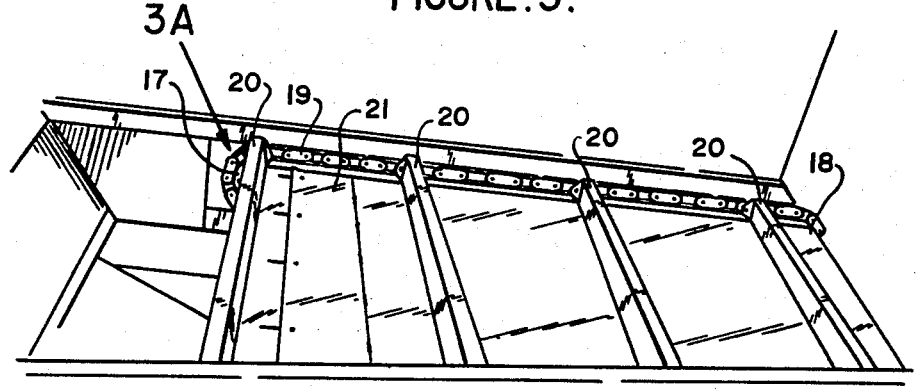
FIG. 3 is a view of the main billet bin elevator.
Figure 3A:
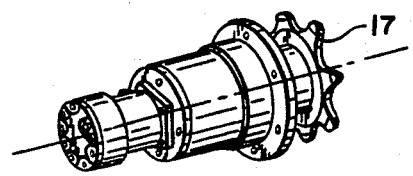
FIG. 3A is an enlarged perspective view of a drive pulley for the elevator illustrated in FIG. 3.

Referring to FIGS. 1, 2, 3 and 3A, a sugar cane billet planter is shown generally at 10 and comprises a main billet bin 11, a sorter hopper 12, and two billet chutes 13. A main bin elevator 15 runs from the bottom to the top of the main billet bin 11 and two sorter bin elevators 16 raise the billets from the sorter hopper 12 to respective billet chutes 13. An operator's console is shown generally at 31 and is located at the forward portion of the planter 10.

The main bin elevator 15 is driven by drive pulleys 17. Idler pulleys 18 are located on each side of the main bin elevator 15 at the bottom of the main billet bin 11. Chain 19 (FIG. 3) runs between idler and drives pulleys 17,18, respectively, and upwardly projecting arms or flights 20 are attached and extend between the chains 19. Stationary plates 21 are fastened beneath the chain 29 to provide a guide for the chains 19 and the conveying surface for the billets as flights 20 travel with the chains 19.

The sorter bin elevators 16 run from the bottom of the sorter hopper 12. The elevators are driven by drive pulleys 23 and pass over idler pulleys 22 at the bottom of the sorter hopper 12.

Figure 2A:
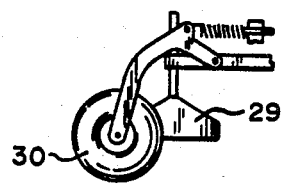
FIG. 2A is an enlarged side view of a coverer for the planter illustrated in FIG. 2.
Figure 5:
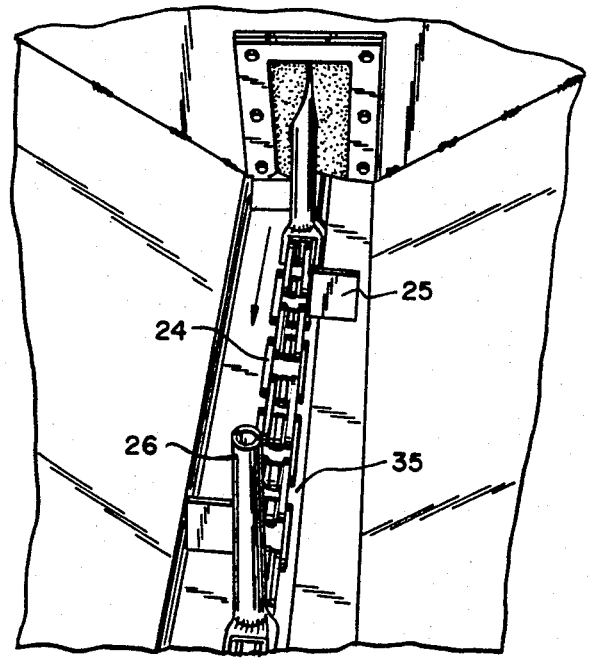
FIG. 5 is an enlarged view of the horizontal and vertically extending alignment fingers of the sorter hopper elevator.
Figure 4:
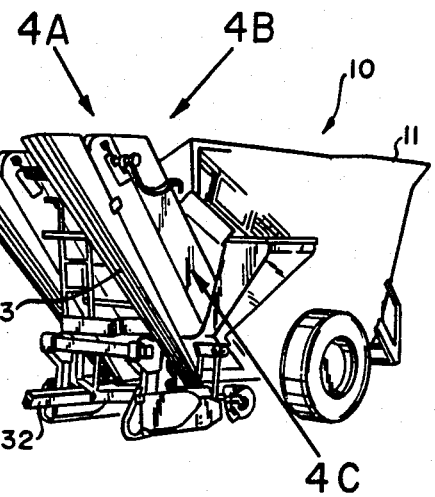
FIG. 4 is a view of the sorter hopper elevators.
Figure 4A:
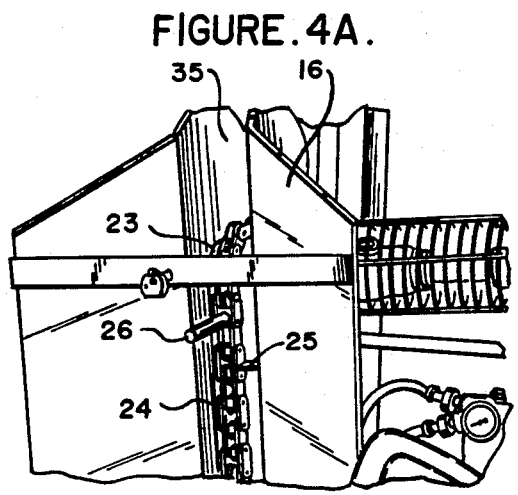
FIGS. 4A, 4B and 4C are enlarged perspective views showing details of portions of one of the elevators of FIG. 4.
Figure 4B:
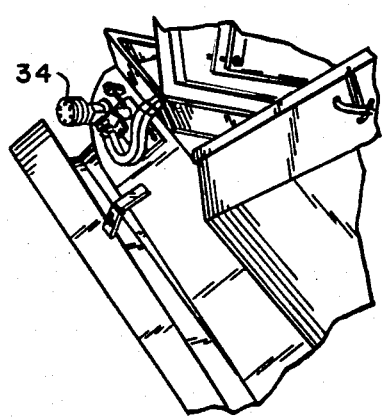
Figure 4C:
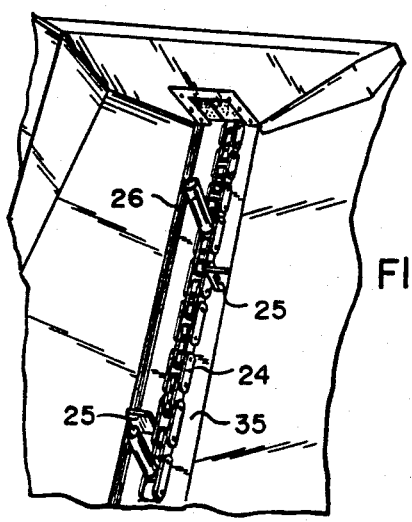

One of the sorter bin elevators 16 (each of which is identical) is shown in more detail in FIGS. 2A, 4, 4A–4C and 5. Chains 24 each extend about drive pulleys 23 and idler pulleys 22. Conveyor fingers 25 are attached to the chain 24 at regular intervals and alternately on opposed sides of the chain 24. The chain 24 and the conveyor fingers 25 move within a recess 35 which is slightly greater in width than a chain 24 and attached conveyor fingers 25 and which extends the length of the chain 24. In addition to conveyor fingers 25, vertical fingers 26 are attached to each chain 24 and extend outwardly therefrom.

Each respective billet chute 13 receives billets from the uppermost portion of each sorter bin elevator 16. One chute 13 exists for each chain 24 of the sorter bin elevator 16 and each chute runs downwardly and rearwardly to respective share boards 27. Share boards 27 orient the billet prior to planting by using a billet funnel 14.

Each share board 27 has a point 28 which creates a furrow for receiving the billets. A converter 29 follows each furrow and respective compaction wheels 30 follow coverers 29. A lift mechanism 33 for each share board 27 allows the share boards 27 to be raised or lowered as desired.

OPERATION

In operation, the billet planter 10 is attached by hitch 32 to a source of pull power (not shown) such as a tractor. The hydraulic lines of the tractor are connected with the hydraulic couplings (not shown) of the planter and this hydraulic power is utilized for the several hydraulic systems.

The planting material in the form of billets is then loaded into the main billet bin 11. The share boards 27 are lowered into the ground by the lift mechanism 33 until the proper depth for the point 28 is obtained while the planter 10 is moved forwardly.

The operator will commence the operation of the main bin elevator 15. This will raise the flights 20 of the elevator 15 upwardly and the billets carried by the flights 20 will move therewith until they reach the highermost level of the elevator 15 where they are deposited into the sorter hopper 12. When an adequate supply of billets is carried by the sorter hopper 12, the operator will terminate the operation of the main bin elevator 15. When the supply of billets in the sorter hopper 12 is inadequate, he will replenish the supply by again commencing the operation of the main bin elevator 15.

The sorter bin elevators 16 are each powered by hydraulically driven drive pulleys 23 and as the elevator commences operation, the projecting alignment fingers 26 untangle and align the billets for the sorter bin elevator 16. The conveyor fingers 25 slide up the floor in recess 35 beneath each elevator 16 and each raises a billet as it passes through the sorter hopper 12.

As the billets reach the uppermost portion of the elevators 16, they fall downwardly into the billet chutes 13 where they slide downwardly and are deposited into billet funnels 14. The point 28 of share board 27 has uncovered a furrow and the billet is deposited in this furrow. Thereafter, coverer 29 covers the furrow and the soil over the furrow is compacted by compaction wheel 30.

The hydraulic system of the planter is such that the speed of sorter bin elevator 16 is dependent on the speed of the planter 10. However, operator control allows the elevator 16 to be stopped or started while the planter 10 is moving. The main bin elevator 15 is run from the hydraulic system of the source of pull power and this system controls the main bin elevator 15 as well as the lift mechanism for the share board.

Accordingly, there has been described an improved billet planter. This planter is subject to many modifications which will fall within the scope of the invention which should, therefore, only be construed by reference to the following claims.

I claim:

1. A method of planting sugar cane billets comprising the steps of providing a supply of said billets in a main supply bin, conveying said billets from said main supply bin to a sorter hopper adjacent said main supply bin by a main bin elevator, conveying said billets individually in an end-to-end relationship on alternately opposed sides of at least one chain means, said chain means conveying said billets within a recess extending from said sorter hopper forwardly and upwardly to an upper end of said chain means, said billets being conveyed longitudinally in a direction parallel to the direction of movement of said chain means to a billet chute and planting said billets from said billet chute.

2. The method of claim 1 and further comprising aligning said billets in said recess within said sorter hopper prior to conveying them from said sorter hopper to said billet chute.

3. The method of claim 1 wherein said billets are conveyed from said sorter hopper to said billet chute in at least two streams, one stream on each of at least two said chain means, said billets being conveyed on opposed sides of each of said chain means in an end-to-end overlapping relationship parallel to the direction of movement of said chain means.

4. The method of claim 3 and further comprising the step of aligning said billets in said sorter hopper prior to conveying them from said sorter hopper to said billet chute.

5. A billet planter comprising a main supply bin, a sorter hopper adjacent said main supply bin, a first billet chute, a supply bin elevator in said main supply bin and a first sorter bin elevator in said sorter hopper, a recess extending substantially the distance of said sorter bin elevator from said sorter hopper, said sorter bin elevator comprising chain means and conveyor fingers located alternatively on opposed sides of said chain means, said chain means and said conveyor fingers being operable within said recess to convey billets longitudinally in an end-to-end relationship substantially parallel to the direction of movement of said chain means.

6. A billet planter as in claim 5 wherein said chain means is endless and revolves about pulleys.

7. A billet planter as in claim 5 wherein said first sorter bin elevator further comprises alignment fingers mounted intermittently along said chain and extending perpendicularly outwardly therefrom.

8. A billet planter as in claim 5 and further comprising a second sorter bin elevator and a second billet chute.

* * * * *